United States Patent
Hatori et al.

(10) Patent No.: US 7,089,493 B2
(45) Date of Patent: Aug. 8, 2006

(54) METHOD, SYSTEM AND PROGRAM FOR ASSOCIATING A RESOURCE TO BE TRANSLATED WITH A DOMAIN DICTIONARY

(75) Inventors: Hiromi Hatori, Yokohama (JP); Yoshiroh Kamiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 10/254,115

(22) Filed: Sep. 25, 2002

(65) Prior Publication Data

US 2003/0061570 A1    Mar. 27, 2003

(30) Foreign Application Priority Data

Sep. 25, 2001    (JP)    ............................ 2001-290620

(51) Int. Cl.
G06F 15/00    (2006.01)
(52) U.S. Cl. ........................ 715/536; 715/500; 704/2
(58) Field of Classification Search ................ 715/532, 715/500, 530, 531, 536; 707/3, 4, 6; 704/2, 704/10, 4
See application file for complete search history.

(56) References Cited

U.S. PATENT DOCUMENTS

| | | | | |
|---|---|---|---|---|
| 5,418,951 A * | 5/1995 | Damashek | ...................... | 707/5 |
| 5,535,120 A * | 7/1996 | Chong et al. | ................... | 704/3 |
| 5,550,741 A * | 8/1996 | Nakajima | ..................... | 715/540 |
| 6,167,397 A * | 12/2000 | Jacobson et al. | ................ | 707/5 |
| 6,208,956 B1 * | 3/2001 | Motoyama | ...................... | 704/2 |
| 6,243,724 B1 * | 6/2001 | Mander et al. | .............. | 715/526 |
| 6,278,967 B1 * | 8/2001 | Akers et al. | ..................... | 704/2 |
| 6,381,598 B1 * | 4/2002 | Williamowski et al. | ........ | 707/5 |
| 6,418,434 B1 * | 7/2002 | Johnson et al. | ................. | 707/5 |
| 6,473,753 B1 * | 10/2002 | Katariya et al. | ................ | 707/4 |
| 6,862,319 B1 * | 3/2005 | Wu | ......................... | 375/240.16 |
| 2001/0013047 A1 * | 8/2001 | Marques | ..................... | 707/536 |
| 2001/0016860 A1 * | 8/2001 | Nosohara | ..................... | 707/536 |
| 2002/0007383 A1 * | 1/2002 | Yoden et al. | ................ | 707/536 |
| 2002/0013693 A1 * | 1/2002 | Fuji | ............................. | 704/2 |
| 2002/0040293 A1 * | 4/2002 | Lee | ................................ | 704/8 |
| 2002/0052901 A1 * | 5/2002 | Guo et al. | ................... | 707/531 |
| 2002/0065647 A1 * | 5/2002 | Hatori et al. | ................... | 704/2 |
| 2002/0161569 A1 * | 10/2002 | Itoh et al. | ...................... | 704/2 |
| 2002/0169592 A1 * | 11/2002 | Aityan | .......................... | 704/2 |
| 2002/0186895 A1 * | 12/2002 | Gloersen | .................... | 382/285 |

(Continued)

FOREIGN PATENT DOCUMENTS

JP    03 078872    4/1991

(Continued)

OTHER PUBLICATIONS

Asiaweek, Say It in Your Own Words: Language Software Is Opening New Doors, Aug. 25, 2000, p. 1.*

(Continued)

Primary Examiner—Cong-Lac Huynh
(74) Attorney, Agent, or Firm—Gerald R. Woods

(57) ABSTRACT

In a machine translation environment, a context-specific domain directory must sometimes be selected to provide a proper translation in context. A database for trigger patterns associated with specific domains is prepared. When a resource is to be translated, appearances of the pattern within the resource are detected. If appearance frequency for at least one domain exceeds a threshold value, the appearance frequency for that domain is compared to the appearance frequency for other domains. If the appearance frequency for the one domain is found to be significantly higher, the dictionary for that domain is selected for the translation.

30 Claims, 6 Drawing Sheets

U.S. PATENT DOCUMENTS

| | | | |
|---|---|---|---|
| 2003/0079185 A1* | 4/2003 | Katariya et al. | 715/530 |
| 2003/0172063 A1* | 9/2003 | Gutta et al. | 707/5 |
| 2004/0161158 A1* | 8/2004 | Kondo et al. | 382/239 |
| 2004/0187131 A1* | 9/2004 | Dageville et al. | 718/100 |
| 2004/0205671 A1* | 10/2004 | Sukehiro et al. | 715/532 |
| 2004/0216050 A1* | 10/2004 | Ono | 715/536 |

FOREIGN PATENT DOCUMENTS

| | | |
|---|---|---|
| JP | 10 021222 | 1/1998 |
| JP | 2001 101185 | 4/2001 |

OTHER PUBLICATIONS

M2 Presswire, OKI Electric Industry: Oki Electric Develops Web-based Machine Translation System Capable of Enhancement through User Collaboration, Sep. 19, 2001, p. 1.*

Shimohata, An Empirical Method for Identifying and Translating Technical Terminology, ACM, pp. 782-788.*

Resnik et al., Semi-Automatic Acquisition of Domain-Specific Translation Lexicon, ACM, pp. 340-347.*

* cited by examiner

METHOD, SYSTEM AND PROGRAM FOR ASSOCIATING A RESOURCE TO BE TRANSLATED WITH A DOMAIN DICTIONARY

FIELD OF THE INVENTION

The present invention relates to a machine translation technique, and more specifically to a technique for associating a resource to be translated with a domain dictionary in order to appropriately switch among multiple electronic dictionaries that are used for the machine translation of the resource.

BACKGROUND OF THE INVENTION

In order to obtain more appropriate translation results, a method presently available for machine translation uses multiple electronic dictionaries including domain dictionaries and a switching mechanism of the electronic dictionaries. Each of the dictionaries carry appropriate terms for use when processing documents written for specific domains.

For example, for the sentence, "People enjoy cherry blossoms this season (translation: Hitobito wa, kono kisetsu sakura wo tanoshimi-masu), "this season" should be translated as "kono kisetsu". On the other hand, in a sport related context, for the sentences, "He is a major leaguer. He hit fifty home runs this season (translation: Kare wa mejaa-liigaadesu. Kare wa kon shiizun 50 pon houmuran wo uchimashita)", "this season" should be translated as "kon shiizun". In this context, a dictionary for sports is used. In the dictionary, "kon shiizun" is registered as the translation of "this season". Thus, where a base dictionary is used in which general terms (those not related to technical domains) are registered in association with source words, the translation for "this season" is "kono kisetsu". Where a dictionary prepared for sports is used, the appropriate translation, "kon shuizun", is obtained. Therefore, it is apparent that if an appropriate electronic dictionary is not used, an appropriate translation may not be obtained. Thus, to achieve more accurate translations, multiple electronic dictionaries, including domain dictionaries, must be available and used as required.

A method for switching among multiple electronic dictionaries, disclosed in Japanese Unexamined Patent Publication No. 2001-110185, prepares trigger patterns (hereinafter referred to simply as patterns) that are used to determine context domains. When a trigger pattern appears, the context domain to which the pattern belongs determines which of multiple dictionaries should be used for the translation.

As an example, the phrase "major leaguer" can be a trigger pattern for sports. When the trigger pattern is encountered in the initial sentence "He is a major leaguer.", that pattern indicates the context is sport related. Priority is given to an available sports-based dictionary so that in the second sentence "this season" is translated appropriately as "kon shiizun".

However, a problem with this method is that a context-specific dictionary cannot be selected until a context-specific pattern is detected. A translation initiated with a base dictionary may be inappropriate for the actual context until a trigger pattern is encountered and a switch is made to a context-specific dictionary.

The recent increased availability of network use techniques, especially for the Internet, has made it easy for people to access network resources from which a broad spectrum of data may be retrieved. However, since network records can appear in various languages a user often finds difficulties in obtaining useable information from a network record written in an unfamiliar language. Therefore, it is desirable to improve machine translation of resources on networks.

A conventional method is available that provides for the switching of multiple electronic dictionaries for the machine translation of network resources. A URL (Uniform Resource Locator) representing an address at which a resource is located on a TCP/IP network is registered as associated with a specific electronic dictionary that a user determines to be appropriate for the subject matter at the URL. Where a request for translation of the subject matter is made, the associated electronic dictionary is used. This method can cope with sentences in which trigger patterns have not yet appeared or for a case wherein a pattern does not appear at a predetermined interval.

However, since a user must manually register an association between a particular electronic dictionary and the URL, the above method requires a great deal of user effort. Further, if the subject matter of the registered URL changes, continued use of the initially-associated electronic dictionary may result on poor quality translations until an association between the URL and the appropriate electronic dictionary can be manually corrected.

It has been determined that resources available on a network can be sorted into the following four types:

(1) a "no domain type" having a topic not related to a specific domain and no patterns that matches patterns registered in a domain dictionary;

(2) a "multiplex domain type" having multiple topic coexisting on the same page;

(3) a "domain change type" having a topic which can change as the subject matter at the URL is updated; and (4) a "specific domain type" having contents related to a topic specific to a particular domain. When a domain dictionary is applied for a "specific domain type" resource, an appropriate translation can be obtained. It should be noted that when a domain dictionary is applied for a resource other than a "specific domain type", inappropriate translation results will be obtained.

SUMMARY OF THE INVENTION

A method for selecting the most appropriate domain dictionary for a resource to be translated includes several steps. A database of patterns to be associated with different specific domains is initially prepared. The same pattern may be associated with different domains. When a request for translation occurs, the frequency with which different patterns occur in the resource to be calculated is established and a determination is made, on a domain-by-domain basis whether the pattern frequency exceeds a predetermined first threshold value. When the pattern frequency is found to exceed the threshold value, a determination is made whether the pattern frequency for the domain is significantly higher than the frequency with which the same pattern appears in other domains. If the pattern frequency is found to be significantly higher for a particular domain, the dictionary associated with that domain is selected for the translation.

DESCRIPTION OF A PREFERRED EMBODIMENT OF THE INVENTION

Figure 1:
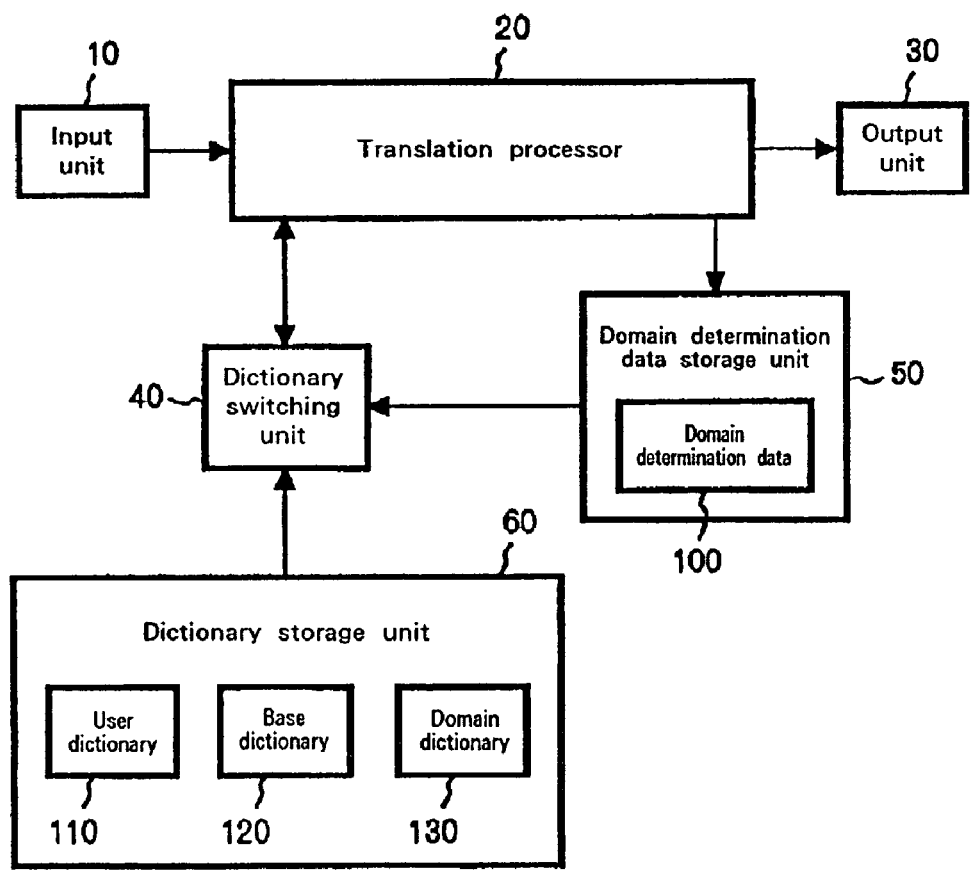
FIG. 1 is a conceptual diagram showing an example of a system configuration employing a method according to the invention for associating a resource with a domain dictionary.

The preferred embodiment of the present invention will now be described in detail while referring to the accompanying drawings. It should be noted, however, that the present invention can be implemented in various other modes and is not limited to the described embodiment. The same reference numerals are employed to denote corresponding or identical components throughout the embodiment.

In this embodiment, an explanation will be given mainly for a method or a system; however, as will be apparent to one having ordinary skill in the art, the present invention can be carried out as a computer-usable program. Therefore, the present invention can be provided as hardware, software or a combination of software and hardware. The program can be recorded on an arbitrary computer-readable storage medium, such as a hard disk, a CD-ROM, an optical storage device or a magnetic storage device.

FIG. 1 is a block diagram showing an example configuration for a machine translation system, according to one embodiment of the present invention, that is implemented by an information processing apparatus, such as a workstation or a personal computer. The system of this embodiment comprises: an input unit 10, a translation processor 20, an output unit 30, a dictionary switching unit 40, a domain determination data storage unit 50, and a dictionary storage unit 60.

The input unit 10 fetches text found using an Internet browser to access a particular URL having a pertinent resource. The input unit 10 fetches source text to be translated and a URL as input data for the system.

The translation processor 20, in accordance with a specific algorithm, automatically translates data fetched by the input unit 10 by using one of multiple electronic dictionaries 110 to 130 selected by the dictionary switching unit 40. The dictionaries are stored in the dictionary storage unit 60. The translation results are transmitted to the output unit 30. Since the translation algorithm is not the essential portion of the invention, and since various algorithms are available as well known techniques and can be obtained as needed by one having ordinary skill in the art, a detailed explanation for them will not be given. The translation processor 20 includes a function for providing domain determination data 100 for the domain determination data storage unit 50.

The output unit 30 includes a function for displaying the machine translation results obtained by the translation processor 20 on a screen or for transmitting the results to another application.

The dictionary switching unit 40 includes a function for using selecting one of the multiple electronic dictionaries 110 to 130 in the dictionary storage unit 60 for use by the translation processor 20, based on the domain determination data 100 stored in the domain determination data storage unit 50.

The domain determination storage unit 50 stores the domain determination data 100 provided by the translation processor 20 and, as needed, transmits the data 100 to the dictionary switching unit 40."

The data for multiple electronic dictionaries 110 to 130 are stored in the dictionary storage unit 60. In this embodiment, the dictionaries stored in the dictionary storage unit 60 are a user dictionary 110, a base dictionary 120 and a domain dictionary 130. General terms are registered in the base dictionary 120 in association with source words, while terms for a specific domain, such as computers, sports, politics or art, are registered in the domain dictionary 130 in association with source words.

Further, the user can register specific terms in the user dictionary 110 in association with source words. The user dictionary 110, rather than the base dictionary 120 or the domain dictionary 130, is always given priority. Therefore, the detailed explanation of the present invention deals only with changing of the priorities for the base dictionary 120 and the domain dictionary 130.

Figure 2:
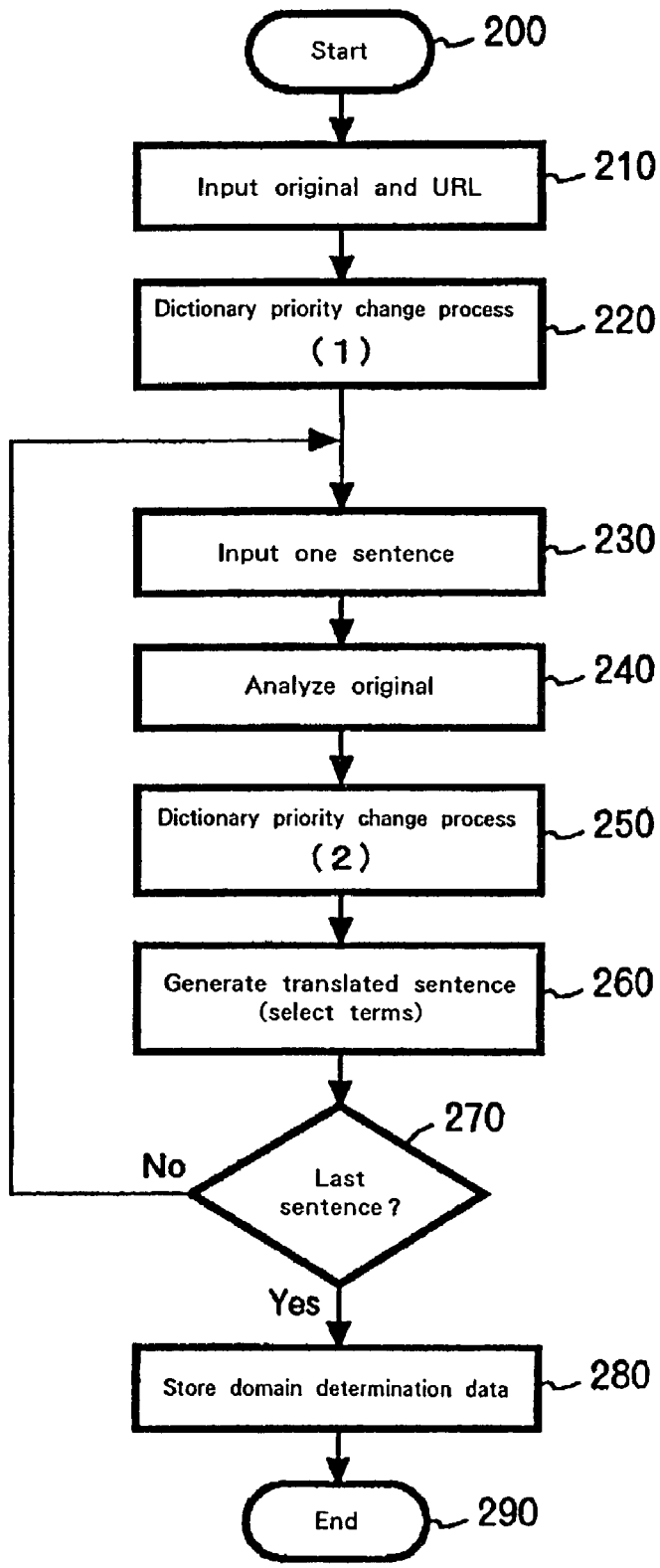
FIG. 2 is a flowchart showing the processing, according to one embodiment of the invention, performed by using the method for associating a resource with a domain dictionary.

FIG. 2 is a flowchart showing the processing performed for the embodiment of the present invention. In the embodiment, the processing is initiated at step 200, and at step 210 the input unit 10 fetches source text to be translated and a URL. Then, at step 220, when domain determination data is present for the URL fetched at step 210, the domain determination data is used to set up a domain dictionary that is always used first for the translation of a resource having the pertinent URL. A detailed description of the process performed at step 220 will be given later. It should be here noted, however, that the domain determination data represents an association between the URL of the resource and the domain dictionary that is established during a previously performed domain determination data storage process (which will be described later).

Then, at step 230 one sentence is extracted from the source sentences. At step 240 the source sentence extracted at step 230 is analyzed. During the analysis of the source sentence, the subject and the verb are identified and the sentence structure is determined. Since the analysis technique is well known, and can be designed and implemented, as needed, by one having ordinary skill in the art, no detailed explanation for it will be given.

When the source sentence has been analyzed at step 240, at step 250, the conventional automatic dictionary switching process, for which a detailed description will be given later, is performed. At step 260, the translation of the sentence is performed while the priorities of the dictionaries are optimally set. Further, since the technique, performed while the dictionary priorities are being optimally set, for the translation of sentences is well known, no detailed explanation for it will be given.

At step 270, a check is performed to determine whether the sentence that was extracted at step 230 and that was translated at step 260 is the last sentence. If the pertinent sentence is not the last sentence, program control returns to step 230 from step 270, along the arrow path No, are the process at steps 230 to 260 is repeated. If the sentence extracted at step 230 and translated at step 260 is the last sentence, program control advances from step 270 to step 280 along the arrow path Yes and the domain determination data is stored, a process that will be described in detail later. Then, at step 290, the processing is terminated.

Figure 3:
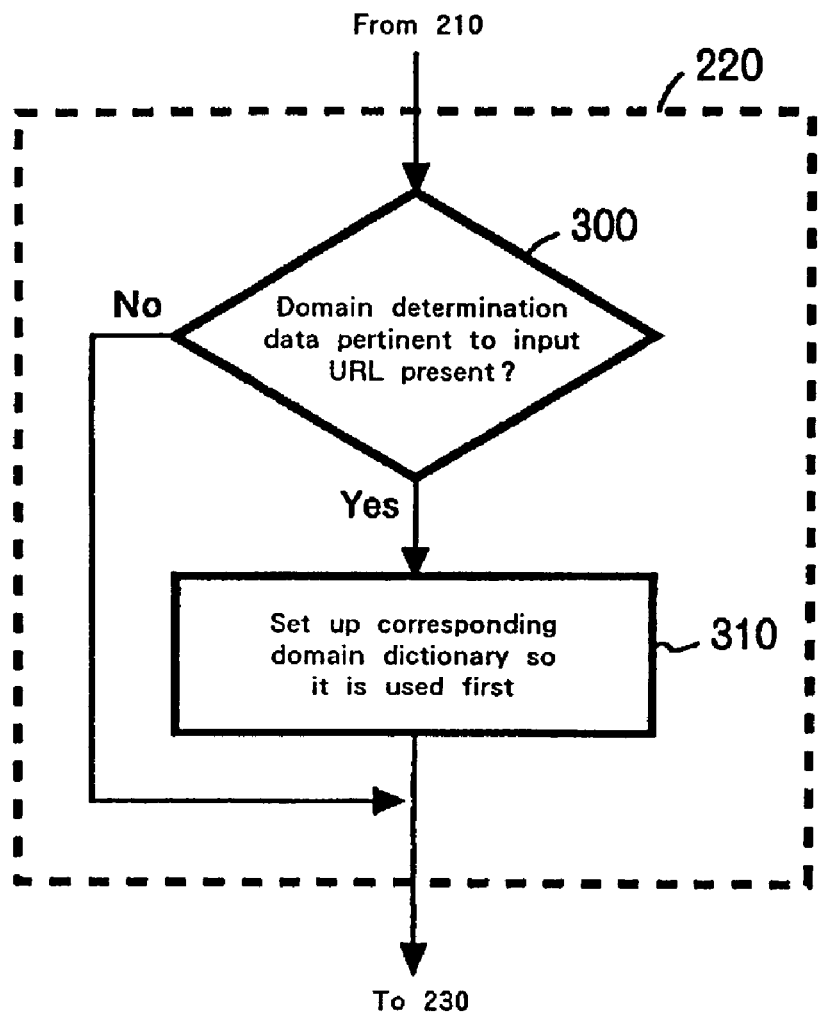
FIG. 3 is a more detailed flowchart for one dictionary priority change process.

The dictionary priority change process performed at step 220 in FIG. 2 will now be described in detail while referring to FIG. 3. During the dictionary priority change process, at step 300 a check is performed to determine whether domain data pertinent to the URL designated at step 210 is present in the domain determination data storage unit 50. If domain determination data are present, program control advances from step 300 to step 310, along the arrow path Yes, and the dictionary priority is changed, so that for the generation of a translated sentence a corresponding domain dictionary is used first at step 260. Program control then advances to step 230. If domain determination data is not present, program control is shifted from step 300 to step 230 along the arrow path No.

Figure 4:
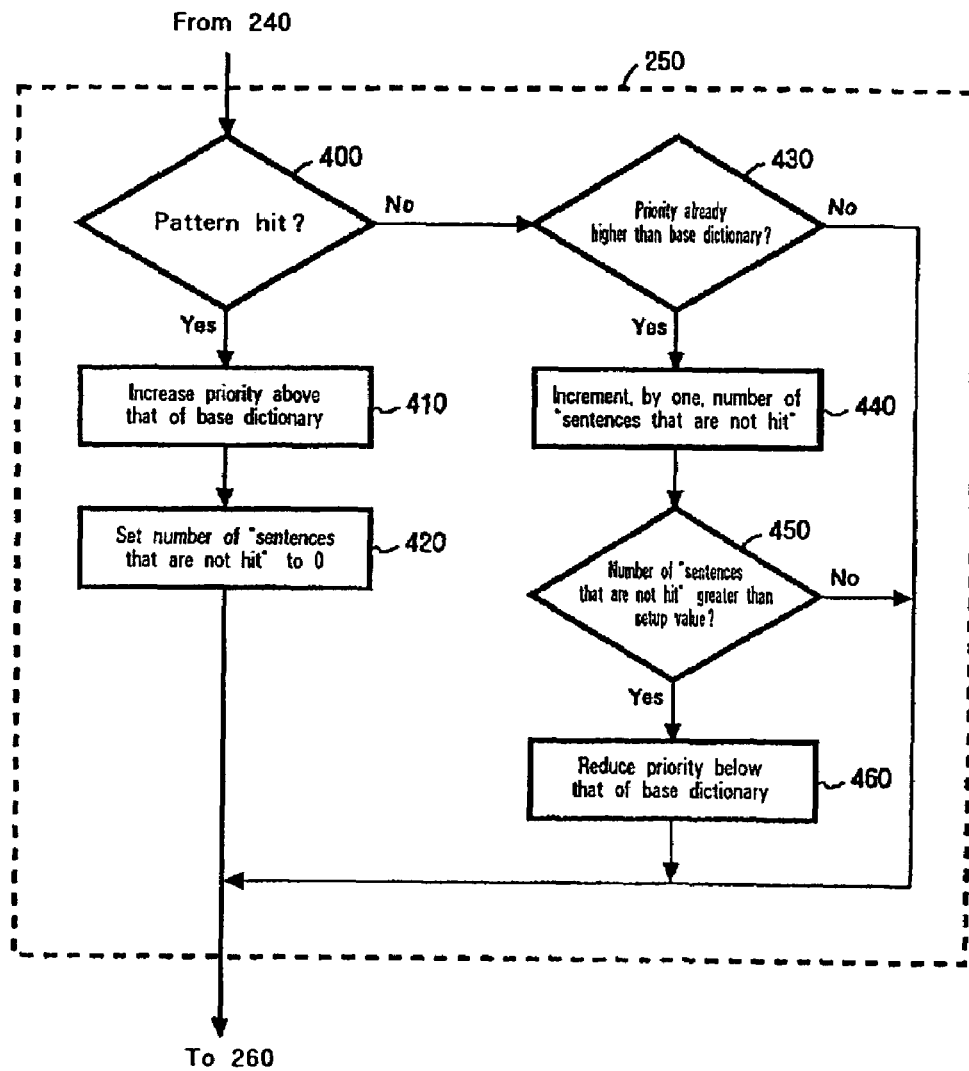
FIG. 4 is a more detailed flowchart for a different dictionary priority change process.

The dictionary priority change process at step 250 in FIG. 2 will now be described in detail while referring to FIG. 4. As previously described, since the domain dictionary set up during the dictionary priority change process (1) is always used first for the translation of sentences at step 260, a dictionary at a lower priority is used for the dictionary priority change process.

First, at step 400, a check is performed to determine whether a trigger pattern used to determine the context domain is present (a hit) for each domain in the data obtained by inputting a sentence at step 230 and by performing the source analysis at step 240. For this pattern, all or a part of the compound words in the domain dictionary need be used. When the pattern is detected, program control advances to step 410 along the arrow path Yes, and at step 410, the priority of the domain dictionary is elevated so that it is higher than the rank of the base dictionary. At step 420 "the number of sentences that are not hit" is set to 0, and program control is shifted to step 260.

When the pattern is not detected at step 400, program control is shifted to step 430 along the arrow path No. Then, at step 430, a check is performed to determine whether a domain dictionary having a higher priority than the base dictionary is already present. When it is ascertained that no domain dictionary has a higher priority than the base dictionary, program control is immediately shifted to step 260 along the arrow path No. If it is ascertained that a domain dictionary having a higher priority than the base dictionary is present, program control advances to step 440 along the arrow path Yes, and at step 440, "the number of sentences that are not hit" is incremented by one. Program control then advances to step 450 whereat a check is performed to determine whether "the number of sentences that are not hit" exceeds a predetermined setup value.

On the contrary, when it is ascertained at step 450 that "the number of sentences that are not hit" exceeds the predetermined setup value, it is assumed that the topic for the current domain has been shifted to the topic for another domain. Thus, program control advances along the arrow path Yes to step 460, whereat the priority of a domain dictionary that is higher than the rank of the base dictionary is reduced so that its rank is not as high as that of the base dictionary. When it is ascertained at step 450 that "the number of sentences that are not hit" does not exceed the predetermined setup value, it is assumed that the current topic has not yet been shifted to another domain. Program control is thereafter immediately shifted to step 260 along the arrow path No.

Figure 5:
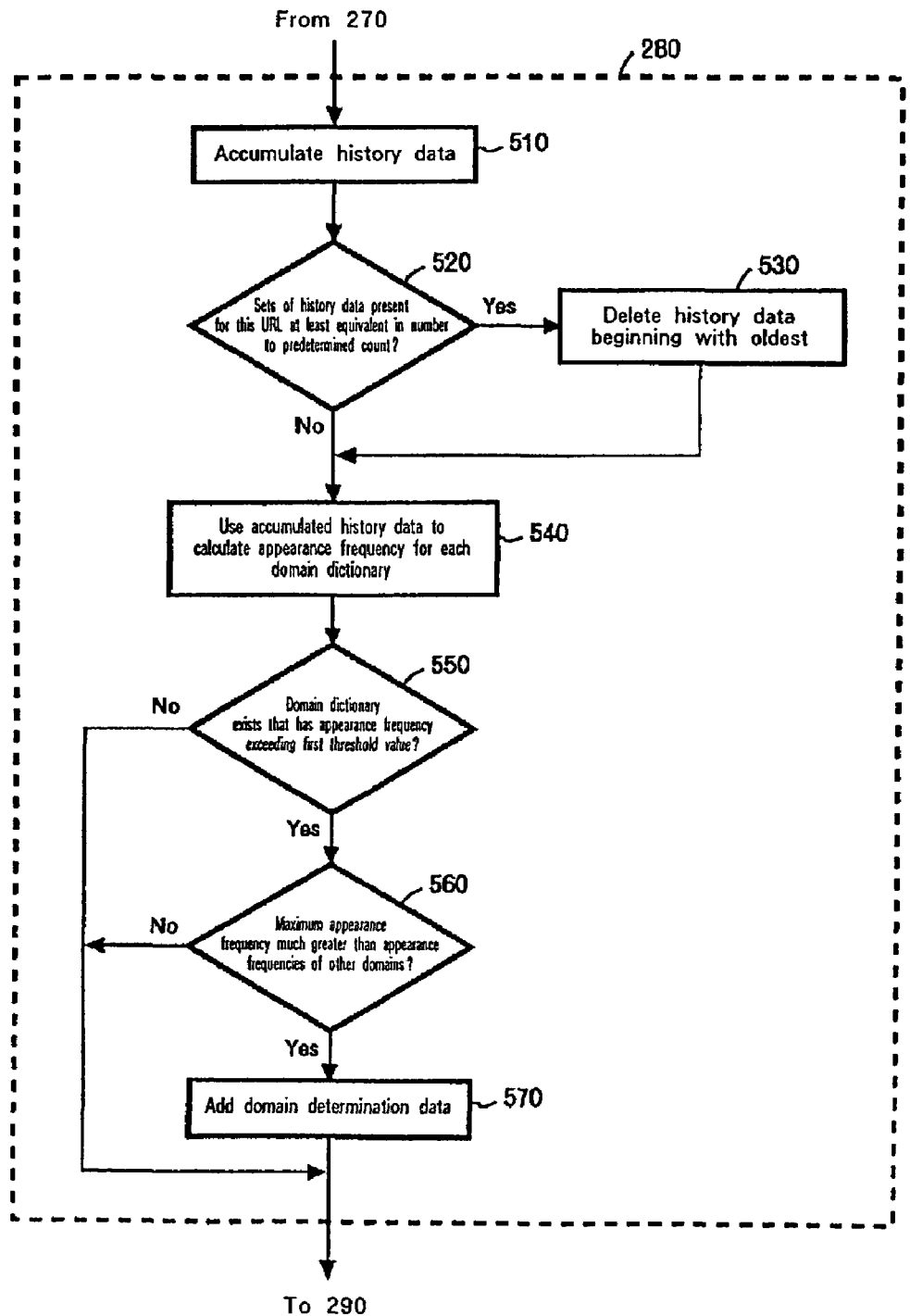
FIG. 5 is a more detailed flowchart for a domain determination data storage process.

The domain determination data storage process at step 280 in FIG. 2 will now be described in detail while referring to FIG. 5. At step 510, history data, i.e., the URL, the total number of sentences and the total number of detected patterns, used for calculating the appearance frequency of a pattern, which will be described later, are stored, a procedure for which the analysis results obtained during the translation process (steps 200 to 270) can be used.

Then, at step 520, a check is performed to determine whether the number of URL history data sets on hand is, at the least, the equivalent of a predetermined count. In this case, it should be noted that in each instance for which history data is accumulated, the data obtained is that which is produced by one translation performed for the URL. Subsequently, when the number of sets of history data is, at the least, the equivalent of the predetermined count, program control advances to step 530 along the arrow path Yes, and while the fact that the data is probably out of date is taken into account, the history data is deleted, beginning with the oldest entry, and program control advances to step 540. However, when the number of history data sets on hand is not, at the least, the equivalent of the predetermined count, the process for the deletion of data is not performed, and program control advances to step 540 along the arrow path No.

At step 540, the appearance frequency of the pattern is obtained for each domain (domain dictionary) by using all the stored history data. For the calculation of the appearance frequency, "the total number of hit patterns" need only be divided by "the total number of sentences" to obtain the ratio. Then, at step 550, the appearance frequency obtained at step 540 is used to determine whether there is a domain for which the appearance frequency exceeds a predetermined first threshold value. When there is no such domain, program control advances to step 290 along the arrow path No. But when there is a domain for which the appearance frequency exceeds the predetermined first threshold value, program control advances to step 560 along the arrow path Yes, and at step 560 a decision is made as to whether the maximum appearance frequency of the domain that exceeds the predetermined first appearance frequency is much greater than the appearance frequencies of the other domains. This can be decided by determining whether the ratio of the maximum appearance frequency of the domain to the total of the appearance frequencies of all the domains exceeds a second predetermined threshold value.

Subsequently, if it is decided that the maximum appearance frequency of the domain is not much greater than the appearance frequencies of the other domains, program control is shifted to step 290 along the arrow path of No. If, however, it is decided that the maximum appearance frequency of the domain is much greater than the appearance frequencies of the other domains, program control advances to step 570 along the arrow path Yes and domain determination data indicating that the URL of the resource is associated with the domain dictionary of the domain is added to the domain determination data storage unit. Thereafter, program control is shifted to step 290.

Figure 6:
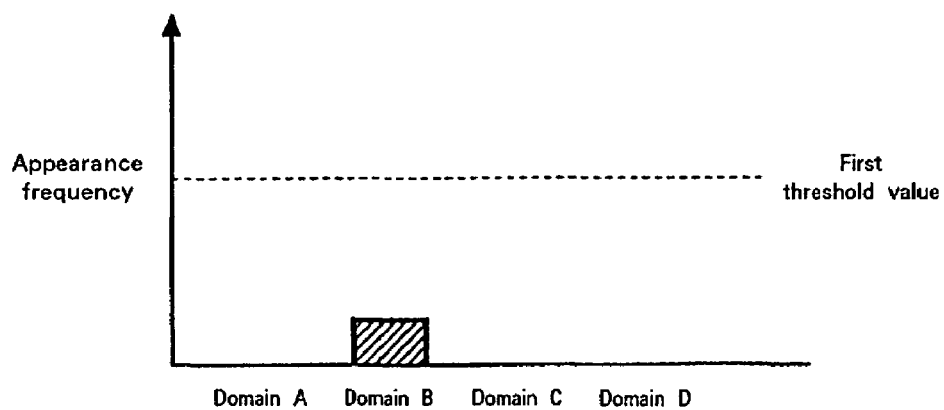
FIG. 6 is a diagram showing a first graph for representing the appearance frequency of each domain according to the embodiment of the invention.

Since at step 550 the presence of the domain dictionary for the appearance frequency that exceeds the predetermined first threshold value is used as a condition for adding the domain determination data, the resource of a "no domain type" is removed from the association target. For example, at step 550, for the case shown in FIG. 6, where the appearance frequencies are concentrated on a specific domain (domain B) but do not exceed the first threshold value, the resource can be determined to be a "no domain type" and can be removed from the association target.

Figure 7:
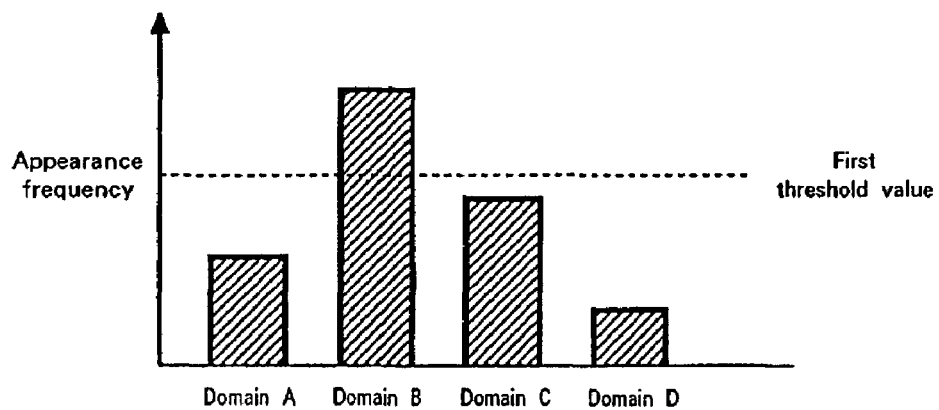
FIG. 7 is a diagram showing a second graph for representing the appearance frequency for each domain according to the embodiment of the invention.

Further, since at step 560 the determination that the maximum appearance frequency for the pattern in the domain is much greater than the appearance frequencies for the other domains is used as a condition for adding the domain determination data, the resource of a "multiplex domain type" can be removed from the association target. For example, as is shown in FIG. 7, a domain for which the appearance frequency is not much greater than the appearance frequencies of other domains, even though it exceeds the first threshold value at step 550, can be determined to be a resource of a "multiplex domain type" and can be removed from the association target. In addition, since the appearance frequency of a domain is determined by using all the stored history data, for a resource of a "domain change type" the data accumulated before and after the domain is changed offset each other, so that there is no domain having an extremely large appearance frequency and a domain determination is not available. As a result, the domain determination data is added only for a resource of a "specific domain type", and the resource can be associated with an appropriate domain dictionary.

As another embodiment, a server may be provided for accumulating history data generated by multiple users, and the history data may be used to generate domain determination data. With this arrangement, the history data is updated more frequently than when the history data for a single user is used, and the history data for many types of resources are accumulated. Therefore, more appropriately, the domain dictionary can be associated with more resources. All the resources at a site (the root address location of a server) tend to belong to the same domain. For example, almost all the resources at the Japanese Patent Office (http://www.jpo.go.jp) site must belong to the intellectual property related domain, and the resources at the International Business Machines Corporation (present applicant) (http://www.ibm.com) site must belong to the computer-related domain.

As the embodiment for which this characteristic is applied, the appearance frequency of a resource that is associated with a specific domain dictionary present at a site is calculated for each domain dictionary, and when it is ascertained that the frequency appearance associated with a specific domain dictionary exceeds a predetermined threshold value, the site can be associated with the specific domain dictionary. For the calculation of the appearance frequency of the resource for each domain dictionary, the total number of resources at a site associated with a domain dictionary can be divided by the total number of resources at the site that have history data to obtain a ratio. With this arrangement, a resource at such a site that has no history data can also be automatically translated by using a domain dictionary associated with the site.

A resource of a "multiplex domain type" is removed from an association target in order to associate the resource with a domain dictionary. Similarly, for the association of a site with a domain dictionary, in order to remove a resource of a "multiplex site type" from an association target, the determination that the maximum appearance frequency of the resource for a domain is much greater than the appearance frequencies of the resources for other domains may be used as an association condition.

According to the invention, since the domain determination data for a resource that has been translated once are fed back to associate the resource with a domain dictionary, more accurate translation results can be obtained. And for a resource that has been translated once and is associated with a domain dictionary, it is possible to avoid a conventional problem whereof appropriate translation results can not be obtained for a sentence until a pattern appears, or a case wherein a pattern does not appear during a specific period. Furthermore, since a user need not manually register the association of a resource with a domain dictionary, it can be readily understood that an excellent, more accurate and useable machine translation can be provided by the present invention than can be provided by the conventional technique.

What is claimed is:

1. For use in a computer system including a database for patterns, each of said patterns being associated with a specific domain in a set of domains, a method for associating a resource to be translated with a domain dictionary comprising the steps of:
   calculating, for each domain, an appearance frequency for a pattern included in said resource;
   determining, for each domain, whether the appearance frequency of the pattern exceeds a predetermined first threshold value;
   where the appearance frequency of the pattern for a particular domain execeds the predetermined first threshold value, comparing the appearance frequency to the appearance frequency for the same pattern in other domains to determine whether the frequency for the particular domain is significantly higher; and
   where the frequency for the particular domain is significantly higher, selecting the domain dictionary associated with the particular domain for translation of the resource.

2. The method according to claim 1, wherein said resource is a resource on a network having one or more specific address locations on said network; and wherein said selecting step is performed by associating an address location with a domain dictionary.

3. The method according to claim 1, wherein said one or more patterns are defined as all or a part of the source words in a domain dictionary.

4. The method according to claim 1, wherein, at said calculating step, a ratio of the number of times a pattern included in said resource to the number of sentences included in said resource is calculated.

5. The method according to claim 1, wherein, at said calculation step, said resource is translated and a ratio of the number of times a pattern is included in the translated portion of said resource to the number of sentences included in said translated portion of said resource is calculated.

6. The method according to claim 1, wherein said calculation step includes a data accumulation step of accumulating data used for calculating the appearance frequency of a pattern; and wherein the calculation of said appearance frequency of said pattern is performed by using said accumulated data.

7. The method according to claim 6, wherein said data accumulation step includes a step of deleting accumulated data that does not attain a predetermined standard.

8. The method according to claim 7, wherein, at said data accumulation step, said data used for the calculation of an appearance frequency for a pattern is stored in a server that accumulates data generated by multiple users and used to calculate said appearance frequency for said pattern.

9. The method according to claim 1 wherein the comparing step comprises determining whether the ratio of the maximum appearance frequency of a pattern for a domain to the total of the appearance frequencies for said pattern for all the domains exceeds a predetermined second threshold value.

10. The method according to claim 1 comprising the further steps of:

calculating, for each domain, the appearance frequency of a resource that is associated with a specific domain dictionary that is located at a site including said resource;

determining, for each domain, whether said appearance frequency of said resource exceeds a predetermined third threshold value; and associating said site with a domain dictionary for said domain when it is predetermined that the appearance frequency for the domain execeds the predetermined third threshold value.

11. A computer system for associating a resource to be translated with a domain dictionary comprising:

a database of one or more patterns, each of said patterns being associated with a specific domain;

calculation means for calculating, for each domain, an appearance frequency for a pattern included in said resource;

first determination means for determining, for each domain, whether said appearance frequency of said pattern exceeds a predetermined first threshold value;

second determination means for determining whether the maximum appearance frequency for said patterns for a domain for which said first determination means determines that said predetermined first threshold value is exceeded is significantly higher than the appearance frequencies of said pattern for other, different domains; and association means for, when said second determination means determines that said maximum frequency appearance of said pattern for said domain is significantly higher than said appearance frequencies of said pattern for said different other domains, associating said resource with a domain dictionary for said domain having said maximum appearance frequency of said pattern.

12. The computer system according to claim 11, wherein said resource is a resource on a network having one or more specific address locations on said network; and wherein said association means associates an address location with a domain dictionary.

13. The computer system according to claim 11, wherein said one or more patterns is defined as all or a part of the source words in a domain dictionary.

14. The computer system according to claim 11, wherein said calculation means calculates a ratio of the number of times a pattern included in said resource to the number of sentences included in said resource.

15. The computer system according to claim 11, wherein said calculation means translates said resource, and calculates a ratio of the number of times a pattern is included in the translated portion of said resource to the number of sentences included in said translated portion of said resource.

16. The computer system according to claim 11, wherein said calculation means includes data accumulation means for accumulating data used for calculating the appearance frequency of a pattern; and wherein the calculation of said appearance frequency of said pattern is performed by using said accumulated data.

17. The computer system according to claim 16, wherein said data accumulation means includes means for deleting accumulated data that does not attain a predetermined standard.

18. The computer system according to claim 17, wherein said data accumulation means includes means for storing, in a server that accumulates data generated by multiple users to be used for calculation of an appearance frequency for a pattern, said data used for the calculation of said appearance frequency for said pattern.

19. The computer system according to claim 11, wherein said second determination means determines whether the ratio of the maximum appearance frequency of a pattern for a domain to the total of the appearance frequencies for said pattern for all the domains exceeds a predetermined second threshold value.

20. The computer system according to claim 11, further comprising: calculation means for calculating, for each domain, the appearance frequency of a resource that is associated with a specific domain dictionary that is located at a site including said resource; third determination means for determining, for each domain, whether said appearance frequency of said resource exceeds a predetermined third threshold value; and association means for, when it is determined at said third determination step that there is a domain that exceeds said predetermined third threshold value, associating said site with a domain dictionary for said domain.

21. A computer program embodied in a computer-readable medium, for associating a resource to be translated with a domain dictionary permitting a computer that includes a database for one or more patterns, each of said patterns being associated with a specific domain to:

calculate, for each domain, an appearance frequency for a pattern included in said resource;

determine, for each domain, whether said appearance frequency of said pattern exceeds a predetermined first threshold value;

where the appearance frequency for a domain exceeds the predetermined first threshold value, determine whether the maximum appearance frequency is significantly higher than the appearance frequencies of said pattern for other, different domains; and where the appearance frequency for a domain is significantly higher than the appearance frequency of other domains, associate the resource with the domain dictionary having the significantly higher appearance frequency.

22. The computer program according to claim 21 wherein said resource is a resource on a network having one or more specific address locations on said network; and wherein said association process is performed by associating an address location with a domain dictionary.

23. The computer program according to claim 21, wherein said one or more patterns is defined as all or a part of the source words in a domain dictionary.

24. The computer program according to claim 21, wherein, in said calculation process, a ratio of the number of times a pattern included in said resource to the number of sentences included in said resource is calculated.

25. The computer program according to claim 21, wherein, in said calculation process, said resource is translated and a ratio of the number of times a pattern is included in the translated portion of said resource to the number of sentences included in said translated portion of said resource is calculated.

26. The computer program according to claim 21, wherein said calculation process includes a data accumulation process for accumulating data used for calculating the appearance frequency of a pattern; and wherein the calculation of said appearance frequency of said pattern is performed by using said accumulated data.

27. The computer program according to claim 26, wherein said data accumulation process includes a process rot deleting accumulated data that does not attain a predetermined standard.

28. The computer program according to claim 27, wherein, in said data accumulation process, said data used for the calculation of an appearance frequency for a pattern is stored in a server that accumulates data generated by multiple users and used to calculate said appearance frequency for said pattern.

29. The computer program according to claim 21, wherein said second determination process is performed by determining whether the ratio of the maximum appearance frequency of a pattern for a domain to the total of the appearance frequencies for said pattern for all the domains exceeds a predetermined second threshold value.

30. The computer program according to claim 21, further comprising: a calculation process for calculating, for each domain, the appearance frequency of a resource that is associated with a specific domain dictionary that is located at a site including said resource;

a third determination process for determining, for each domain, whether said appearance frequency of said resource exceeds a predetermined third threshold value; and an association process for, when it is determined at said third determination step that there is a domain that exceeds said predetermined third threshold value, associating said site with a domain dictionary for said domain.

* * * * *